United States Patent

Cohen et al.

[11] Patent Number: 5,144,530
[45] Date of Patent: Sep. 1, 1992

[54] POWER DISTRIBUTOR DEVICE FOR ELECTRIC INSTALLATIONS

[75] Inventors: Jacques Cohen, Couchey; Daniel Nourry, Dijon; Jean-Pierre Thierry, Couternon, all of France

[73] Assignee: Telemecanique, France

[21] Appl. No.: 517,866

[22] Filed: May 2, 1990

[30] Foreign Application Priority Data

May 3, 1989 [FR] France ............................... 89 06150

[51] Int. Cl.⁵ .............................................. H02B 1/20
[52] U.S. Cl. .................................. 361/378; 174/99 B;
    361/355; 361/361; 439/114; 439/213; 439/714
[58] Field of Search ............. 200/51 R, 307; 439/110,
    439/113, 114, 119, 121, 210, 212, 213, 638, 639,
    701, 712, 716, 717, 718; 174/70 B, 71 B, 72 B,
    88 B, 99 B, 101, 95-99 R, 129 B, 133 B, 148,
    149, 156; 361/331, 332, 334, 346, 355, 356, 358,
    361, 378, 393, 394, 396, 426, 429, 379

[56] References Cited

U.S. PATENT DOCUMENTS

| | | | |
|---|---|---|---|
| 3,263,131 | 7/1966 | Rowe | 361/378 |
| 3,909,502 | 9/1975 | Lacan | 174/97 |
| 4,077,434 | 3/1978 | Sieckert | 174/101 |
| 4,142,225 | 2/1979 | Diersing | 361/358 |
| 4,242,718 | 12/1980 | Shariff | 361/341 |
| 4,916,574 | 4/1990 | Hancock | 361/355 |
| 4,938,719 | 7/1990 | Sawai | 439/714 |

*Primary Examiner*—Gerald P. Tolin
*Attorney, Agent, or Firm*—William A. Drucker

[57] ABSTRACT

A power distributor device is disclosed for electric installations, comprising, for housing a set of power bars, an insulating case formed preferably of several interlockable modules. A member, for example an endpiece in the form of a lyre is associated with a zone for fixing the case on a support allowing expansion between the case and the support. An upstream connection box may be assembled to the case and comprise a zone for fixing to the support.

8 Claims, 2 Drawing Sheets

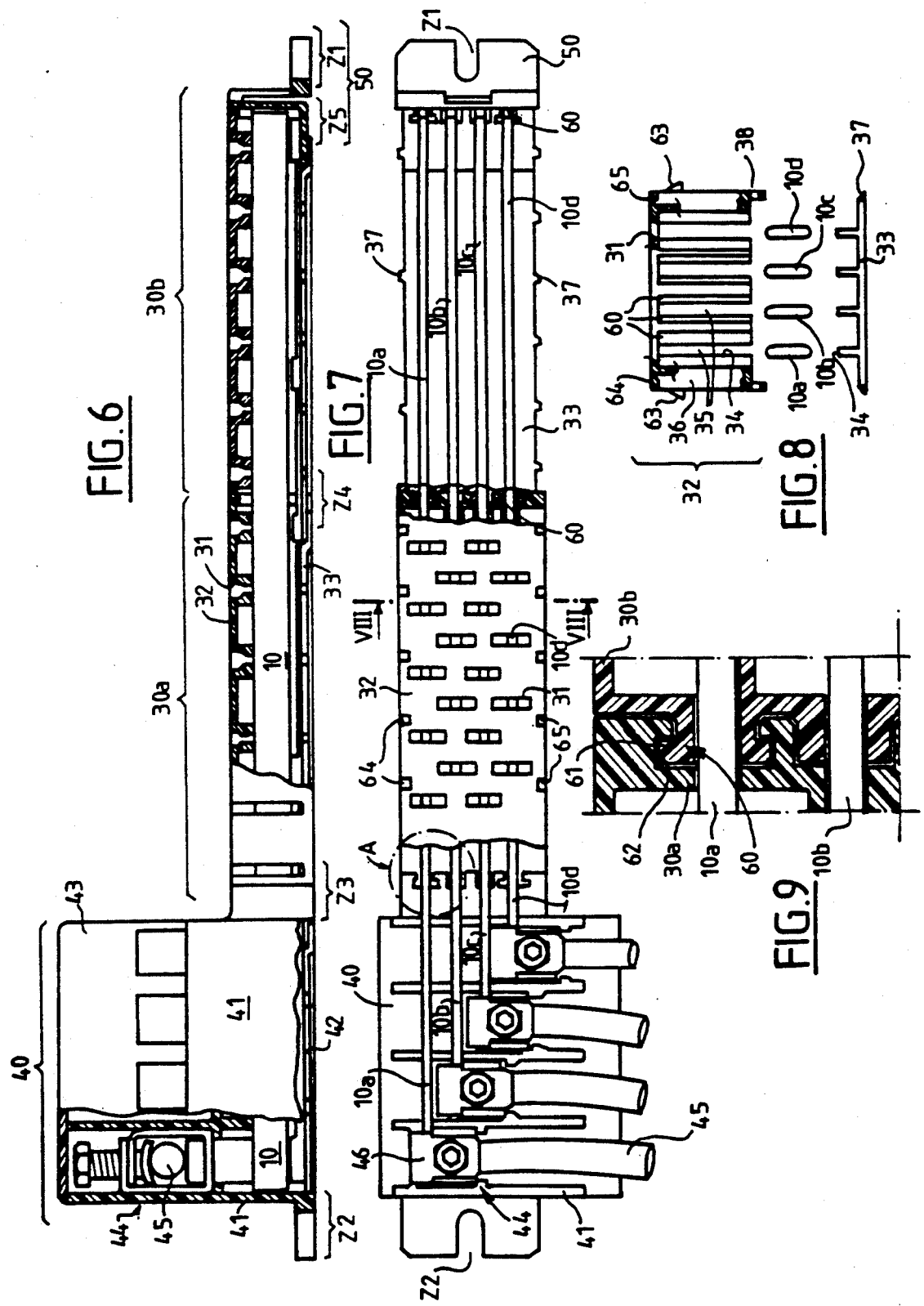

POWER DISTRIBUTOR DEVICE FOR ELECTRIC INSTALLATIONS

BACKGROUND OF THE INVENTION

The present invention relates to a power distributor device for low voltage electric installations, this device being for example associated with electric control and-/or protection appliances housed in a frame, cabinet or box.

Such known devices comprise a set of horizontal power bars and an elongate insulating case housing the set of bars, which can be fixed on a support and have at the front, i.e. towards the installer or user, a plurality of orifices. These orifices serve for connecting conductors providing the electric connection between the bars and power terminals of electric appliances belonging to the installation, such appliances being themselves mounted on rails parallel to the device or on bases fixed to the rails.

It is desirable to be able to readily construct distributor devices of variable length in which insulation between the different bars is satisfactory. In addition, known arrangements, taking into account the relative heat expansion of the insulating case with respect to the support, are cumbersome and inconvenient.

The purpose of the invention is to comply with these desiderata and avoid such drawbacks. Its object in particular is to facilitate assembly of the distributor device without adversely affecting the insulation between bars by means of a distributor device of simple design.

Another object is to allow relative expansion of the insulating case with respect to the support using simple and compact means.

SUMMARY OF THE INVENTION

According to the invention, the insulating case of a distributor device of the type described comprises at least two zones for fixing on the support and has a member which is associated with one at least of the fixing zones and which allows relative heat expansion between the case and the support.

In a first aspect of the invention, the insulating case may advantageously comprise several insulating modules having, in adjacent regions, slits for passing the bars therethrough and means for mutual interlocking and or snap-fitting assembly.

Preferably, mutual interlocking of the modules is provided by interlocking elements contiguous with the bars and adapted for increasing the leak paths between the bars and the assembly zone of the modules.

Thus, the distributor device can be readily constructed with different lengths as a function of the width of the installation and/or of the foreseeable number of appliances to be connected without needing to store a large number of parts. Interlocking of the modules facilitates their assembly, for example by pre-fabrication in the factory, without adversely affecting the insulation between bars.

In a second aspect of the invention, the expansion member is an end-piece, preferably interlockable, situated at one end of the insulating case. Furthermore, the end-piece absorbs the relative expansion of the case with respect to the support, which expansion may be considerable following heating of the bars and connection points. In addition, the end-piece provides closure of the end of the insulating case and, if required, supports the ends of the bars. The insulating case may comprise at one end an upstream connection box, preferably interlockable, housing members which connect the set of bars to upstream conductors, this box comprising one of the fixing zones and possibly an associated expansion member. The connection box may advantageously give access to the upstream conductors on two opposite sides, which makes it possible to place the box on the left or right of the distributor device.

The mutual interlocking means between the modules of the insulating case, the end-piece and the upstream connection box may be replaced or completed by snap-fit means.

BRIEF DESCRIPTION OF THE DRAWINGS

Other features and advantages of the invention will be clear from the following description of a non limitative example, with reference to the accompanying drawings, in which:

FIGS. 6 and 7 show on a larger scale and with parts cut away a bottom view and an elevational view of the distributor of FIG. 2;

FIG. 8 is an exploded view in enlarged section through VIII—VIII of the distributor of FIG. 7; and FIG. 9 shows the detail A of FIG. 7.

DESCRIPTION OF THE PREFERRED EMBODIMENTS

Figure 1:
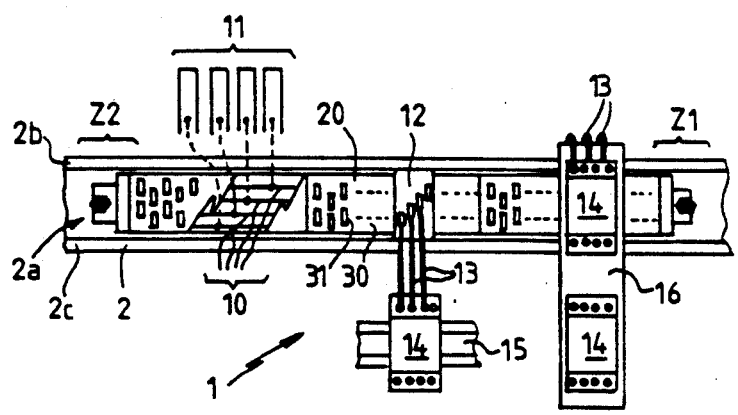
FIG. 1 shows schematically a power distributor device according to the invention.

The power distributor device 1 shown in the figures is intended to be fixed on a support 2 such as a profiled rail, a frame or a perforated or solid plate, this support being independent or forming part of an electric distribution case such as a cabinet or a box. The distributor device may be assembled by an installer but it is preferably pre-fabricated in the factory to the desired length and mounted by the installer on the support.

The distributor comprises a set of power bars 10 made from a conducting metal whose number corresponds to that of the electric connections to be made to upstream conductors 11 and to downstream conductors 12 electrically connected by conductors 13 to control and/or protection appliances 14 such as switches, reverse current relays or similar. The appliances in question are carried either by a standardized rail 15 parallel to the distributor and its bars or by a base 16 associated with the connector and itself snap-fitted on support 2 when the latter is profiled.

Figure 2:
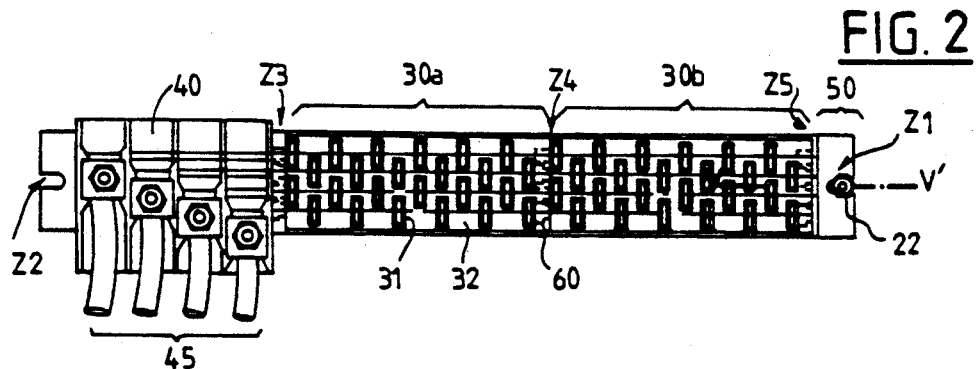
FIG. 2 shows in elevation a prefabricated distributor device with two modules, expandable end-piece and upstream connection box interlocked and snap-fitted.
Figure 3:
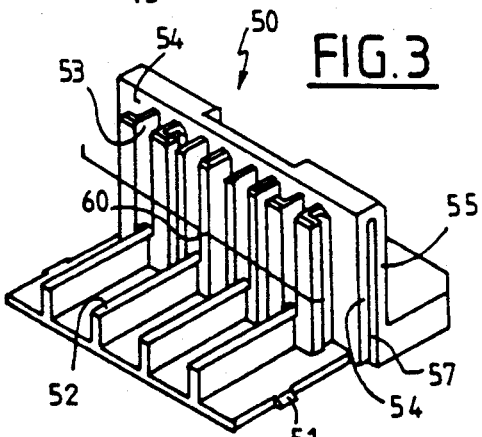
FIGS. 3 and 4 are two perspective views, respectively from the inside and outside of the distributor, showing the expansion end-piece.

The distributor 1 comprises an insulating case 20 of elongate shape, housing the set of bars 10. The case is made from a molded plastic material and in the present embodiment is formed of several modules 30, for example two modules 30a, 30b in FIGS. 2, 6 and 7. This composition permits assembly of the device with a minimum of parts. The case has at the front a plurality of orifices 31 for passing therethrough the terminations of conductors 13. These terminations are either the bared ends of the conductors or end-pieces fitted thereon when a terminal, included in the device and connected electrically to a corresponding bar, is associated with each orifice 31 or plugs when the connectors 12 are plugged directly on to the bars. Orifices 31 are staggered but may also be aligned; they are situated opposite bars 10. The insulating case 20 has at its ends two zones Z1, Z2 for fixing on support 2, a screw-nut assembly 22 being associated with each of these zones. The insulating case 20 is advantageously housed in the central space 2a of a shaped cover 2, between flanges 2b, 2c thereof.

The insulating case 20 also comprises an upstream connection box 40 and a closure and expansion absorption end-piece 50 having fixing zones corresponding to zones Z1, Z2. Box 40 and end-piece 50 will be described further on, but it may already be noted that modules 30 are assembled together, to box 40 and to end-piece 50 by mutual interlocking elements 60 (see FIGS. 2, 3 and 7 to 9) contiguous with the bars and adapted for increasing the leak paths between bars in the junction zones Z3 between module 30a and the connection box 40, Z4 between the modules 30a and 30b and Z5 between module 30b and end-piece 50. FIG. 6 shows module 30a seen from the outside in its left-hand portion; the rest of module 30a and module 30b are shown in section in a longitudinal plane perpendicular to that of FIG. 7. On the left of FIG. 7 can be seen box 40 and a portion of module 30a whose upper part is removed. The rest of module 30a is seen from the outside, except in the junction region with module 30b, this region being shown in section. The rest of module 30b is illustrated after removal of the front cover.

Each module 30 of the insulating case is formed (FIG. 8) of a front cover 32 with U shaped cross section, having orifices 31 and forming a gullet housing the power bars 10a–d and a flat plate 33 clipped on to the front cover. The front cover and the plate are molded from a plastic material whose expansion coefficient is greater than that of the metal of bars 10.

The bars are housed for axial sliding in holding conformations 34 of the front cover and of the plate. It will be noted that the interlocking elements 60 are provided on each side of slits 35 formed in the end walls 36 of modules 30 so as to create a labyrinth effect for the leak lines. It is obvious that interlocking elements may be provided other than those shown but contributing to insulation in a similar way.

Plate 33 comprises lateral snap-fit elements 37 which cooperate with complementary elements 38 of the front cover. The plates 33 of the different modules overlap slightly in zones Z6 slightly offset from the junction zones Z4, Z5.

Plate 33 could in a variant have a U shaped section, the front cover 32 then being a simple flat lid.

The upstream connection box 40 comprises a body 41, a base plate 42 and a lid 43. Body 41 has the fixing zone Z2 and houses clamping terminals 44 for the upstream conductors 45. Each terminal 44 comprises a conducting part 46 in direct contact with the corresponding bar 10a–d of the device. Appropriate partitions in box 40 and modules 30 provide insulation between the phases; the insulation is provided satisfactorily in zone Z3 by snap-fit elements identical to those of zone Z4. The detail A of zone Z3 is shown enlarged in FIG. 9 and shows the complementarity of form between collars 61 and grooves 62 of elements 60.

Figure 4:
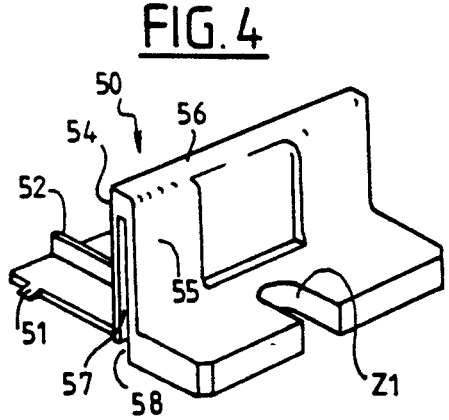
Figure 5:
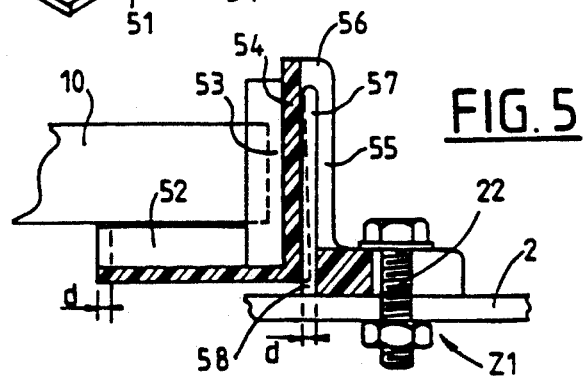
FIG. 5 is a view of the end-piece in section through plane V-V' in FIG. 2.

End-piece 50 is made from a semi-rigid plastic material and is in the form of a lyre (FIGS. 3 to 5) with snap-fit elements 60 for snap-fitting into the complementary elements of the adjacent module 30b, as well as snap-fit lugs 51 for snap-fitting into openings in the front cover of module 30b. The end-piece comprises a zone Z1 for fixing to support 2. Ribs 52 are provided for a free end of bars 10 for holding them in the alignment of ribs 34 of the adjacent plate 33 and grooves 53 defined by the snap-fit elements 60 and by a wall 54 of the end-piece. Grooves 53 have a sufficient depth for in all cases holding the free ends of bars 10. Wall 54 and a contiguous wall 55 are connected together by a bridge 56 and define therebetween a slit 57. The width of the slit in its open region 58 is determined so that wall 54 may draw closer to wall 55 by at most a distance d when the insulating case 20 expands more than support 2.

The expansion member could also be formed by a system for fixing with clearance using an oblong orifice, but the resilient closure end-piece described is advantageous in not being dependent on the clamping force exerted by the installer in the fixing zone.

When the upstream connection is made by means other than box 40, a closure and expansion end-piece 50 may be provided at each end of the insulating case. It will be noted that the insulating case has inclined projections 63 for snap-fitting connectors 12 by means of resilient lugs (see FIG. 8). Moreover, polarizing means are provided on or in the insulating case for preventing connectors 12 or bases 16 from being wrongly mounted. The polarizing means in question are advantageously punch-out caps provided on the modules 30 of the insulating case; two separate rows of caps 64, 65 may be provided situated respectively at the top and at the bottom of the modules (FIG. 7). Thus, depending on the punching out of one or other row of caps previously in the factory, a male element of a connector may be engaged in a punched out cap and not be engaged in a non punched out cap; thus, the phase connections will be correctly provided.

Mounting of the device is facilitated thereby, since the same connection box may be used on the left or on the right, by fixing thereto modules of the same type and by associating with the modules connectors or bases having always the same position relatively to the user.

What is claimed is:

1. An electric power distributor device for supplying low voltage apparatuses, comprising:
   a support member;
   an elongate insulating case of generally rectangular cross section, said case comprising at least two modular length sections and joining means interlocking said length sections in an end-to-end relationship, said case having a front face with a plurality of orifices regularly distributed on said front face, and an opposite face with first and second end regions, and fixing means securing said first and second end regions on said support member;
   a plurality of parallel power bars housed in said case along the length thereof; a plurality of input power supply conductors and an upstream connection box interlocked with an adjacent modular length section of the case, said connection box including said first end region of the case and housing clamping means connecting said input power supply conductors to one end of said power bars; a plurality of output conductors having terminations which pass through said orifices and connect said output conductors to said power bars; and an expansion absorbing end member having two portions movable relative to each other connected to said second end region of the case allowing relative heat expansion between the case and the support member.

2. A distributor device as claimed in claim 1, wherein the bars are flat and located in planes at right angles to said front face and said joining means consist of interlocking end portions of said length sections of the case, said end portions having surface portions parallel to said planes and engaging said bars and labyrinth-shaped further portions mutually engaging each other.

3. A distributor device as claimed in claim 1, wherein said expansion absorbing end member has first and second generally parallel wall portions at right angles to said front face, first joining means connecting the first wall portion to one modular length section at said second end region of the case and second joining means connecting the second wall portion to said support member, said first and second wall portions being mutually interconnected at a distance from said first and second joining means and having facing respective surface portions which form an expansion absorbing slit therebetween.

4. A distributor device as claimed in claim 1, wherein said first wall portion forms a closure of said case at said second end region.

5. A distributor device as claimed in claim 1, wherein each of said modular length sections comprises an insulating U-shaped cover provided with said orifices and an insulating base plate snap-fitted to said cover, said cover having grooves at right angles to said front face and having said bars and said base plate having ribs respectively engaging said grooves and holding said bars within said grooves.

6. A distributor device as claimed in claim 1, wherein each of said modular length sections comprises an insulating U-shaped cover provided with said orifices and an insulating base plate snap-fitted to said cover, said cover having grooves at right angles to said front face and having said bars and said base plate having ribs respectively engaging said grooves and holding said bars within said grooves and wherein said first joining means comprise a plate parallel to said front face and connected to said base plate of said one modular length section, means connecting said first wall portion to said cover of said one modular length section, said first wall portion and said plate having grooves housing said bars and said plate having ribs in alignment with the ribs of said base plate.

7. A distributor device as claimed in claim 1, wherein said output conductor terminations form part of a connector and said insulating case has polarizing means for preventing wrong mounting of said connector.

8. A distributor device as claimed in claim 7, wherein said polarizing mans include punch out caps provided in rows on the front face of the insulating case.

* * * * *